(12) United States Patent
Panin et al.

(10) Patent No.: US 6,782,709 B2
(45) Date of Patent: Aug. 31, 2004

(54) COLD AIR REFRIGERATING SYSTEM AND TURBOEXPANDER TURBINE FOR THIS SYSTEM

(76) Inventors: Alexandr A. Panin, d, 19.kv.8 ul Bolshaya Bronnaya, Moscow (RU), 103104; Alexandr A. Peshkov, d.32/1.kv.20, ul Bljukhera, Novosbirsk (RU), 630092; Jury A. Ravikovich, d.6.rd.102, ul Bibliotechnaya, Moscow (RU), 109544

( * ) Notice: Subject to any disclaimer, the term of this patent is extended or adjusted under 35 U.S.C. 154(b) by 0 days.

(21) Appl. No.: 10/168,665

(22) PCT Filed: Dec. 27, 2000

(86) PCT No.: PCT/RU00/00532

§ 371 (c)(1),
(2), (4) Date: Sep. 3, 2002

(87) PCT Pub. No.: WO01/48424

PCT Pub. Date: Jul. 5, 2001

(65) Prior Publication Data

US 2003/0046950 A1 Mar. 13, 2003

(30) Foreign Application Priority Data

Dec. 28, 1999 (RU) .......................................... 99127784

(51) Int. Cl.[7] .............................. F25D 17/04; F28B 9/00
(52) U.S. Cl. ............................... 62/404; 62/172; 62/402
(58) Field of Search ........................ 62/172, 404, 402, 62/503, 498, 116; 415/202, 211.2

(56) References Cited

U.S. PATENT DOCUMENTS 4,283,924 A * 8/1981 Schutze ........................ 62/402
5,086,622 A * 2/1992 Warner ........................... 62/88
5,461,882 A * 10/1995 Zywiak ......................... 62/401

FOREIGN PATENT DOCUMENTS

| GB | 1459400 | 4/1974 |
| GB | 1583143 | 5/1977 |
| SU | 1059217 | 12/1983 |
| SU | 1290040 | 2/1987 |
| SU | 1495601 | 7/1989 |
| WO | PCT/US7900652 | 8/1979 |
| WO | WO8000468 | 3/1980 |

* cited by examiner

*Primary Examiner*—Chen Wen Jiang
(74) *Attorney, Agent, or Firm*—Seth Natter; Natter & Natter

(57) ABSTRACT

An air-cooling device comprises compressor (1). Double cavity heat exchanger (2), turbo expander (6) and the freezing chamber (3) containing fan (5) and air cooler (4). Fan (7) is mounted on the same shaft with the turbo expander (6). The first cavities of the heat exchangers (9 and 2), moist separator (8) and the second cavity of the heat exchanger (2) are connected with the compressor (1) input in sequence. In the other appearance the device comprises compressor (44) and turbo expander (49), double cavity heat exchanger (45), freezing chamber (46) containing fan (48) and air cooler (47), double cavity vaporization heat exchanger (51) and moist separator (50). The first cavities of the vaporization heat exchangers (51 and 45), moist separator (50, turbo expander (49), air cooler (47) and the second cavity of the heat exchanger (45) are in sequence connected with the compressor input (44). The bearing disk (67) of the turbine wheel (66) is constructed with inter blade canals (69) conjugates by means of the flutes (70) with the meridional disk surface (67). The canal surface (69) contain longitudinal micro canal (71). The radius of the micro canal (71) cross cut IS 0.1–1.0 of the radius (Rf) of the flute (70), the pitch (t) between the micro canals (71) is not more than the double radius (Rk) and the height (h) of the micro canal (710 is about 0.2–1.0 of the radius (Rk).

18 Claims, 10 Drawing Sheets

COLD AIR REFRIGERATING SYSTEM AND TURBOEXPANDER TURBINE FOR THIS SYSTEM

This application is a 371 of PCT/RU05/00532 filed Dec. 27, 2000.

TECHNICAL FIELD

The present invention relates in cooling systems, especially air cooling system and turbo wheel of the turbo expander

BACKGROUND ART

Cooling device (SU, A, 802740) comprising compressor connected with turbo expander by means of heat exchanger, cooling chamber and additional supercharger mounted between the heat-exchanger and cooling chamber.

Said device needs heat exchanger cooling system as the air temperature in the output of the compressor is high enough (about 120–140 degrees Celsius) thus increasing total power used by the cooling device. Besides if there is some amount of water steam it may lead to the freezing of the nozzle and working grate of the turbo expander.

The closest solution to the applied is the air cooling device (SU, A, 1290040) comprising compressor and turbo expander both mounted in the same shaft together with the regenerative heat-exchanger and cooling chamber with both fan and air cooler mounted inside.

Said device has limited parameters of cooling chamber temperature regulation along with weak freeze productivity and economy.

A turbo wheel (SU, A1, 059217) is known comprising bearing disk with blades and inter blade canals made by means of the nearest blades' sides conjugated with meridian disk surface by means of flutes, said surface contain longitudinal micro canals with cross sections appearing as a part of a circle.

While working in conditions of humid air with negative work temperatures in the turbine flowing part and on the surface of inter blade canals of the working wheel in particular, it may lead to the ice film effect. Besides said turbine wheel provokes considerable hydro losses.

DISCLOSURE OF THE INVENTION

The principal object of the invention is the creation of an air cooling device providing the primarily air temperature decrease in the device up to the surrounding air dew point or 0 degrees C. correspondingly by means of air vaporization cooling and additional rarefy in the vaporization heat exchanger as well as turbine, turbo expander wheel of the said device the construction of which providing the device permanent work in the conditions of moist air and under the negative temperatures in the freezer.

Air cooling device comprises compressor, the first heat exchanger, turbo expander with turbine wheel, freezing chamber with both the first fan and air cooler mounted inside. According to the invention, said chamber is equipped with the second fan being mounted on the same shaft together with turbo expander, double cavity heat exchanger and the first moist separator. The first heat exchanger appears as double cavity and the first cavity of the vaporization heat exchanger, first moist separator, turbo expander, air cooler and the second cavity of the first heat exchanger are connected consequently to the input of the compressor.

The use of the double cavity vaporization heat exchanger in the device offered allows decreasing the temperature of the feeding air up to the dew point temperature of the surrounding air. That is, for example, if the surrounding air temperature is about +50 degrees C. and the relative humidity is about 40 percent, the air in the vaporization heat exchanger decreases its temperature to about +36 degrees C. Humidity separator makes it possible to considerably dry the moist air fed to the turbo wheel of the turbo expander.

For constant maintenance of the air vaporization cooling process it is necessary that the device should be equipped with water tank connected with the second cavity of the vaporization heat exchanger.

To intensify the process of both air vaporization cooling and create additional rarefying both the input and output of the second cavity of the vaporization heat exchanger are connected with the atmosphere by means of the second fan.

The device may comprise ejector, the first regulated valve and the second moist separator, the passive nozzle of ejector being connected with the atmosphere by means of both the second cavity of the vaporization heat exchanger and the first regulated valve, the active nozzle of the ejector being connected the second fan input. All these measures allow rarefying in the second cavity of the vaporization heat exchanger, thus additionally intensifying the process of vaporization cooling of the atmosphere air which leads to considerable reduce of its temperature.

To increase freezing productivity of the system additionally due to the feeding air pressure increase into turbo expander is possible. For this purpose said system comprises the third fan, both input and output of the second cavity of vaporization heat exchange being connected with the atmosphere by means of the third fan. The second fan input is connected with the compressor output, the second fan output is connected with the vaporization heat exchanger first cavity input.

The system may be equipped with the second and the third double regulated valve, the first cavity of the heat exchanger being connected with the second cavity of the first heat exchanger and compressor input, and the second being connected with the atmosphere by means of the fourth fan, the first cavity of the third heat exchanger being connected with the first cavity of the vaporization heat exchanger and the second fan output, while the second is connected with the atmosphere by means of the fifth fan. The second regulated valve is being mounted between the compressor input and output. In this case both the second heat exchanger and the fourth fan may be used as a conditioner.

For additionally air cooling and drying inside the system said device is additionally equipped with the fourth double cavity heat exchanger, the sixth fan and the third moist separator, the first cavity of the fourth heat exchanger being connected with compressor output and by means of the third moist separator with the second fan input, while the second cavity being connected with the atmosphere by means of the sixth fan.

To provide efficient work of the device under conditions of negative temperatures without moisture freezing on its elements said device is equipped with the first adsorbing moist separator, the first receiver, the third and fourth regulated valves, the first and the second reverse valves, both the first reverse valve and the first adsorbing moist separator being mounted in sequence between the first cavity of vaporization heat exchanger and the first cavity of the first heat exchanger, compressor output by means of the first receiver. While the fourth regulated valve is connected between the first reverse valve and the first adsorbing moist separator, the compressor input is additionally connected with the atmosphere by means of the third regulated valve, while the first receiver is connected with the atmosphere by means of the second reverse valve.

The compressor output of the proposed device may be connected with the first vaporization heat exchanger cavity, the device may be being equipped additionally with the fifth double cavity along with heat exchanger and the seventh fan. The first cavity of the fifth heat exchanger being connected with both compressor output and vaporization heat exchanger first cavity while the second being connected with the atmosphere by means of the seventh fan. In this case the device is able to implement the close cycle with the atmosphere air feeding.

The device is equipped with the second receiver, the second adsorbing moist separator, the third and the fourth reverse valves, the fifth, the sixth and the seventh regulated valves, the sixth regulated valve being mounted between the second cavity and the first heat exchanger being connected with compressor input by means of both fourth reverse valve and the second adsorbing moist separator. The compressor output is additionally connected between the second adsorbing moist separator and the fourth reverse valve by means of the third reverse valve, second receiver and the fifth regulated valve. The compressor output is additionally connected between the second adsorbing moist separator and the fourth reverse valve by means of the third reverse valve, second receiver and the fifth regulating valve, while compressor output is additionally connected with the atmosphere by means of the seventh regulated valve. Due to this effect an extra moist exclusion is provided.

To decrease considerately the noise level said device comprises the eighth and the ninth fans along with double cavity heat exchanger, the second cavity of the vaporization heat exchanger being connected with the atmosphere by means of the eighth fan. The first cavity of the sixth heat exchanger is connected with both input and output of the second fan, while the second cavity is connected with the atmosphere by means of the ninth fan.

The device may be equipped with the fourth moist separator and freeze accumulator, both being mounted in sequence between the turbo expander and air cooler. Such construction provides low temperature maintenance, i.e. in conditions of long time open front door of the freezing chamber.

The task set may be solved by means of the equipment of the air cooling device comprising compressor and the turbo expander with the turbine wheel, both being mounted on the same shaft, freezer with the first fan and air cooler mounted inside, in accordance with the invention, with double cavity vaporization heat exchanger being implemented as double cavity one. The first cavity of the vaporization heat exchanger along with the first moist separator, turbo expander, air cooler and the second cavity of the first heat exchanger are connected with the compressor input in sequence.

As the second way of its implementation the device may be equipped with the $10^{th}$ fan. The second cavity of the vaporization heat exchanger being connected with the atmosphere by means of the $10^{th}$ fan. The device may be equipped with the $7^{th}$ heat exchanger and the $11^{th}$ fan, the first cavity of the $7^{th}$ heat exchanger being connected with both the compressor output and the first cavity of the vaporization heat exchanger. The second cavity is connected with the atmosphere by means of the $11^{th}$ fan. Said device may be equipped with the water tank being mounted in the second cavity of the vaporization heat exchanger. Besides it may comprise both the $4^{th}$ moist separator and freezer accumulator being mounted in sequence between the turbo expander and the air cooler. The device comprises the $8^{th}$ regulated valve, the compressor input being additionally connected with the atmosphere by means of the $8^{th}$ regulated valve.

The formation of the electric engine together with turbo expander and electric compressor may be mounted on the same shaft along with the turbo expander and the compressor. Said engine comprises the body containing turbo expander, electric engine and the compressor, electric engine rotor being implemented as turbine and compression wheels mounted cantileverly the shaft mounted in bearings. The cavity between the compressor wheel bearing and the electric engine being connected with the restart canal compressor entry. Regulated throttle may be being mounted inside the said restart canal. Such implementation of the turbo expander and the electric compressor allows increasing in economy and in freeze productivity of the device.

Mounted task may by solved by means of turbine wheel comprising bearing disk with the blades and inter blade canals implemented by means of the side surfaces of the nearest blades being conjugated with meridian surface of the disk by means of the flutes. The meridinal surface of the disk contains longitudinal micro canals with cross section as a part of the circle. In accordance with the invention radius of the said micro canal cross section is about 0.1–1.0 of the flute radius, the pitch between the canals is not more than two micro canals radiuses while the canal height is approximately 0.2–1.0 of the micro canal cross section radius.

Turbine wheel implemented accordingly to the invention allows raising its efficiency in ice formation conditions as well as lowering hydro losses by means of stream disturbance reduce in the inter blade canal.

THE DESCRIPTION OF THE DRAWINGS

The invention offered is illustrated with the examples of its implementation and drawings attached. On these drawings.

BEST METHOD OF CARRYING OUT THE INVENTION

Figure 1:
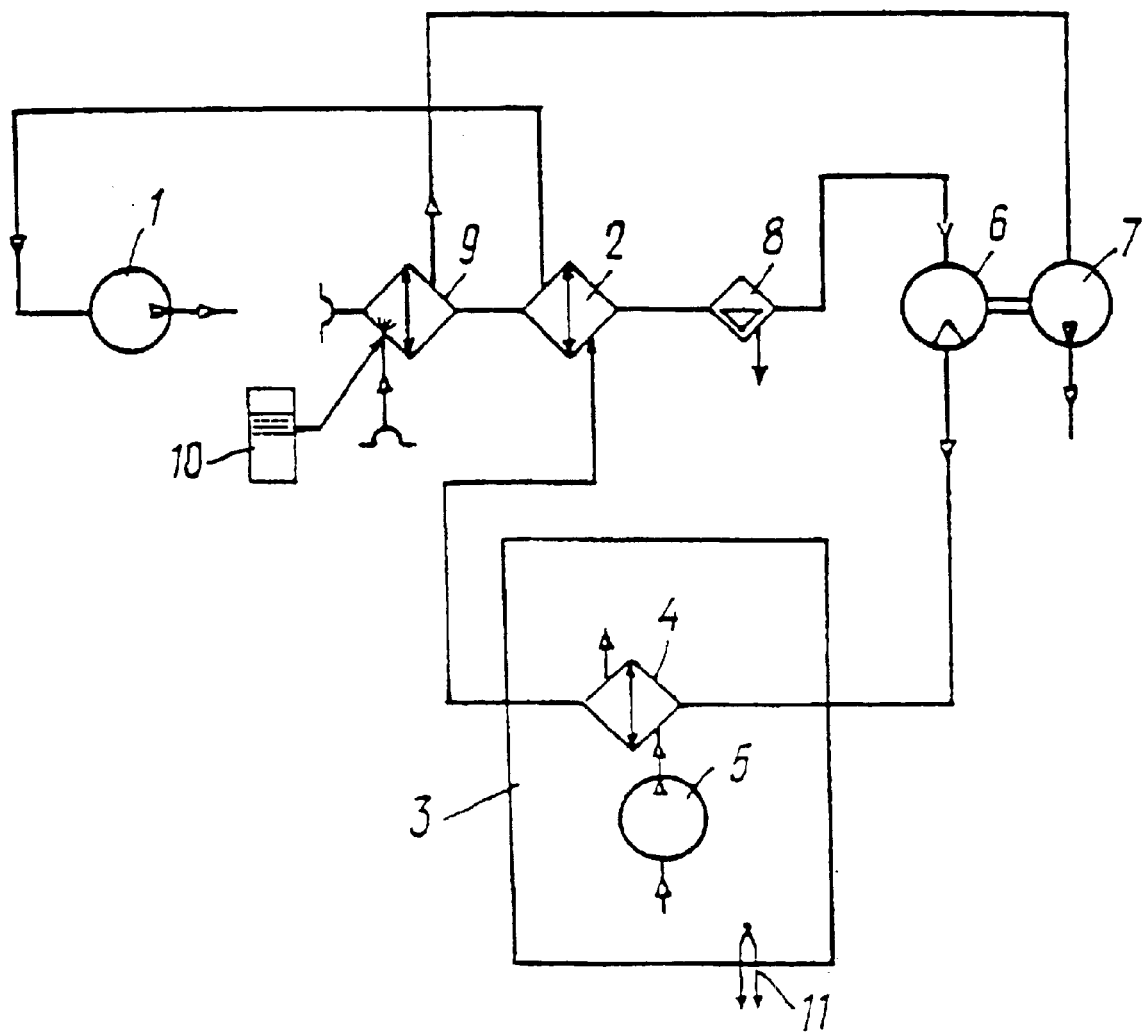
FIG. 1 illustrates the scheme of one of the air cooling device variants.

The air cooling device comprises compressor 1 (FIG. 1), regenerative double cavity heat exchanger 2, freezing chamber 3 with air cooler 4 and the fan 4 mounted inside, turbo expander 6 with the fan 7 mounted on its shaft, moist separator 8, double cavity heat exchanger 9, water tank 10 and temperature indicator 11. The first cavity of the vaporization heat exchanger 9, the first cavity of the heat exchanger 2, moist separator 8, turbo expander 6, air cooler 4 and the second cavity of the heat exchanger 2 are connected with the compressor input 1 in sequence. The water tank 10 is connected with the second cavity of the vaporization heat exchanger 9. The temperature indicator 11 is mounted inside the freezing chamber 3. The input and output of the vaporization heat exchanger second cavity 9 are connected with the atmosphere by means of the second fan 7.

Figure 2:
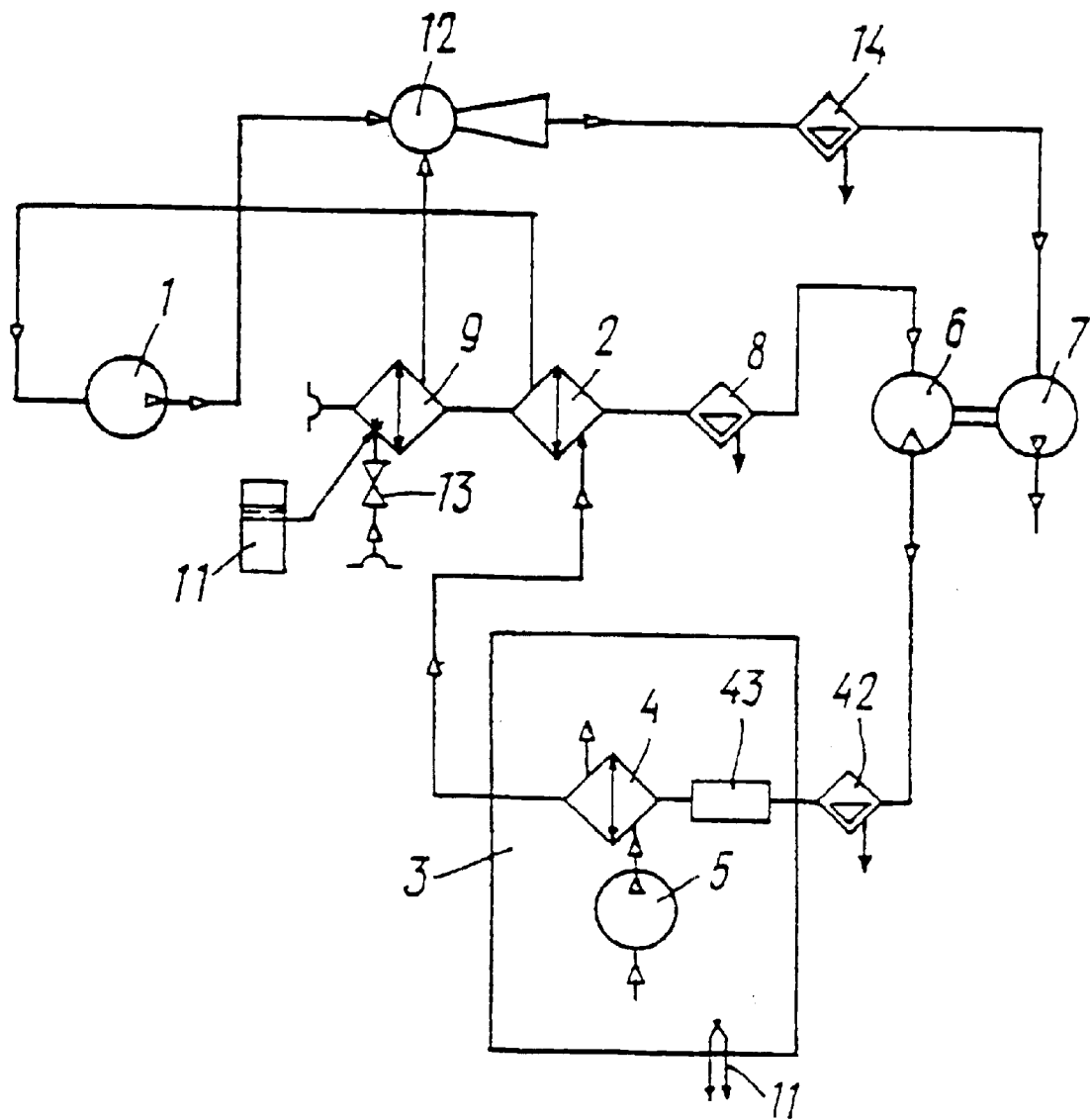
FIG. 2 illustrates the cooling device together with the ejector

The device presented on FIG. 2 is equipped with the ejector 12, regulated valve 13 and moist separator 14, the passive nozzle of the ejector 12 being connected with the compressor output 1, while ejector diffuser 12 being connected with the atmosphere by means of both the second cavity of the vaporization heat exchanger 9 and regulating valve 13. The active nozzle of the ejector 12 is connected with the compressor output 1 and the ejector diffuser 12 by means of the moist separator 14 is connected with the fan input 7.

Figure 3:
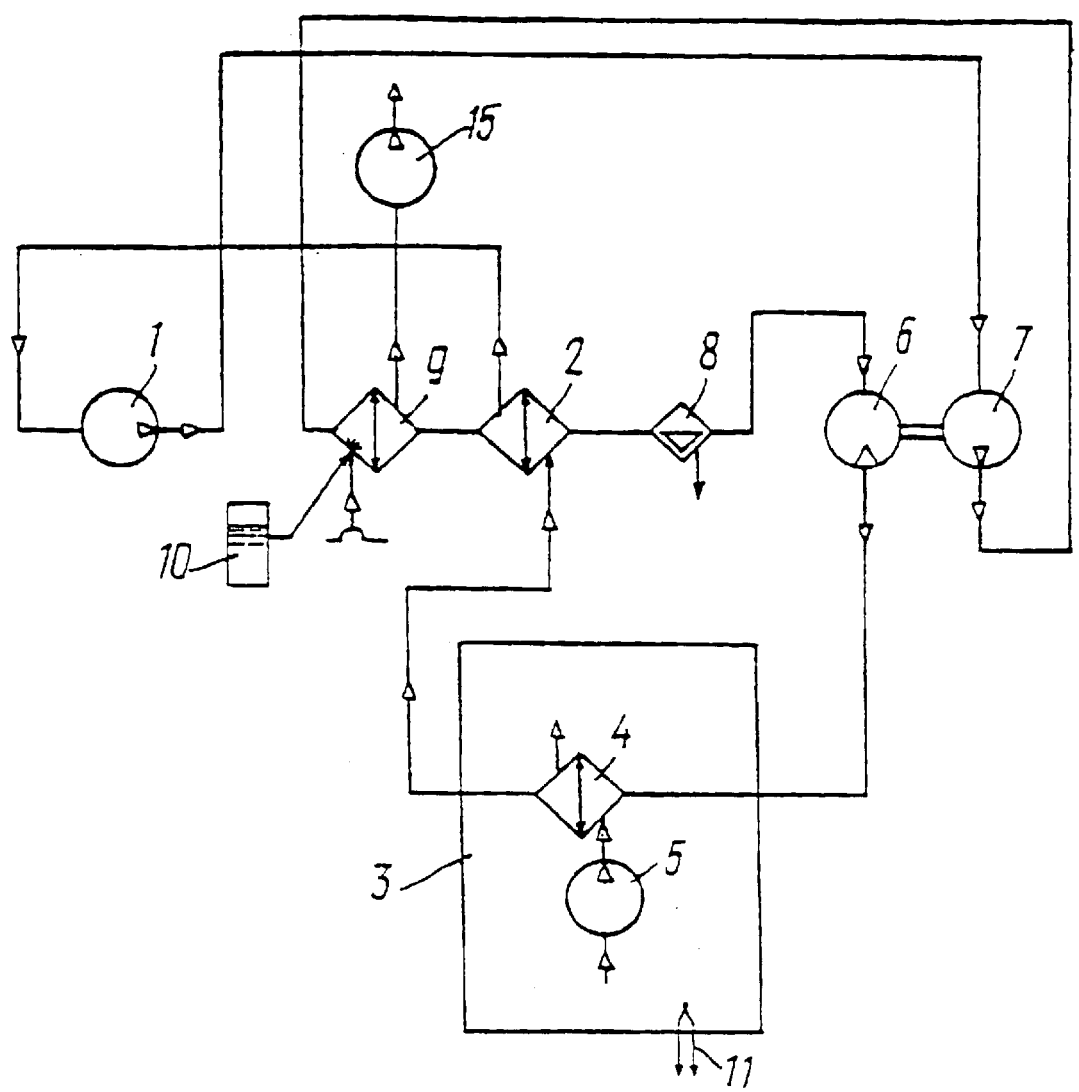
FIG. 3 illustrates the cooling device with one of the ways of fan connection to the vaporization heat exchanger.

The device on FIG. 3 is equipped with the fan 15, both the second cavity input and output of the vaporization heat exchange 9 being connected with the atmosphere by means of the fan 15, the fan 7 input is connected with the compressor output 1. The fan output 7 is connected with the vaporization heat exchanger 9 first cavity input.

The device may be additionally equipped with double cavity heat exchangers 16 and 17 (FIG. 4), fans 18 and 19 and regulating valve 20. The first heat exchanger cavity 16 being connected with the second heat exchanger 2 cavity and the compressor 1 input. The second cavity of the heat exchanger 16 is connected with the atmosphere by means of the fan 18, the first cavity of the heat exchanger 17 is connected with both the first cavity of the vaporization heat exchanger 9 and the fan 7 output, while the second cavity of the heat exchanger 17 with the atmosphere by means of the fan 19. The regulating valve is mounted between both input and output of the compressor 1.

The device may be equipped with the double cavity heat exchanger 21, the fan 22 and moist separator 23. The first cavity of the heat exchanger 21 is connected with the compressor 1 output and by means of the moist separator 23 is connected with the atmosphere.

Figure 5:
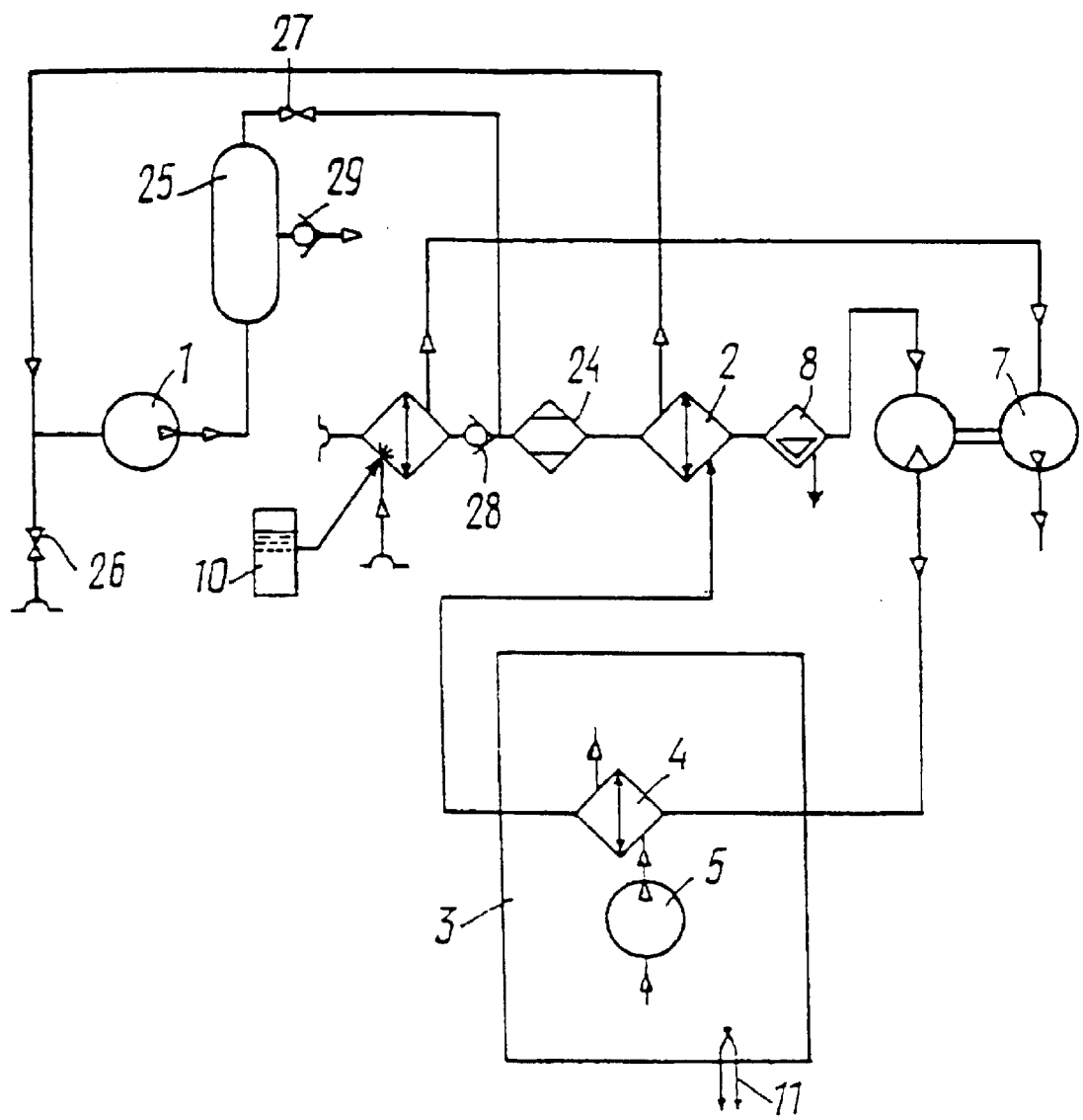
FIG. 5 illustrates one of the variants of the air cooling device equipped with adsorbing moist separator, receiver and regulated valves.

The device illustrated by FIG. 5 is equipped with adsorbing moist separator 24, receiver 25, regulating valves 26 and 27 and reverse valves 28 and 29. The reverse valve 28 and adsorbing moist separator 24 are mounted in sequence between the first cavity of the vaporization heat exchanger 2, compressor 1 output through the receiver and regulating valve 27 is connected between the reverse valve and adsorbing moist separator 24. The compressor 1 input is additionally connected with the atmosphere by means of the regulating valve 26, while the receiver 25 is connected with the atmosphere by means of the reverse valve 29.

Figure 6:
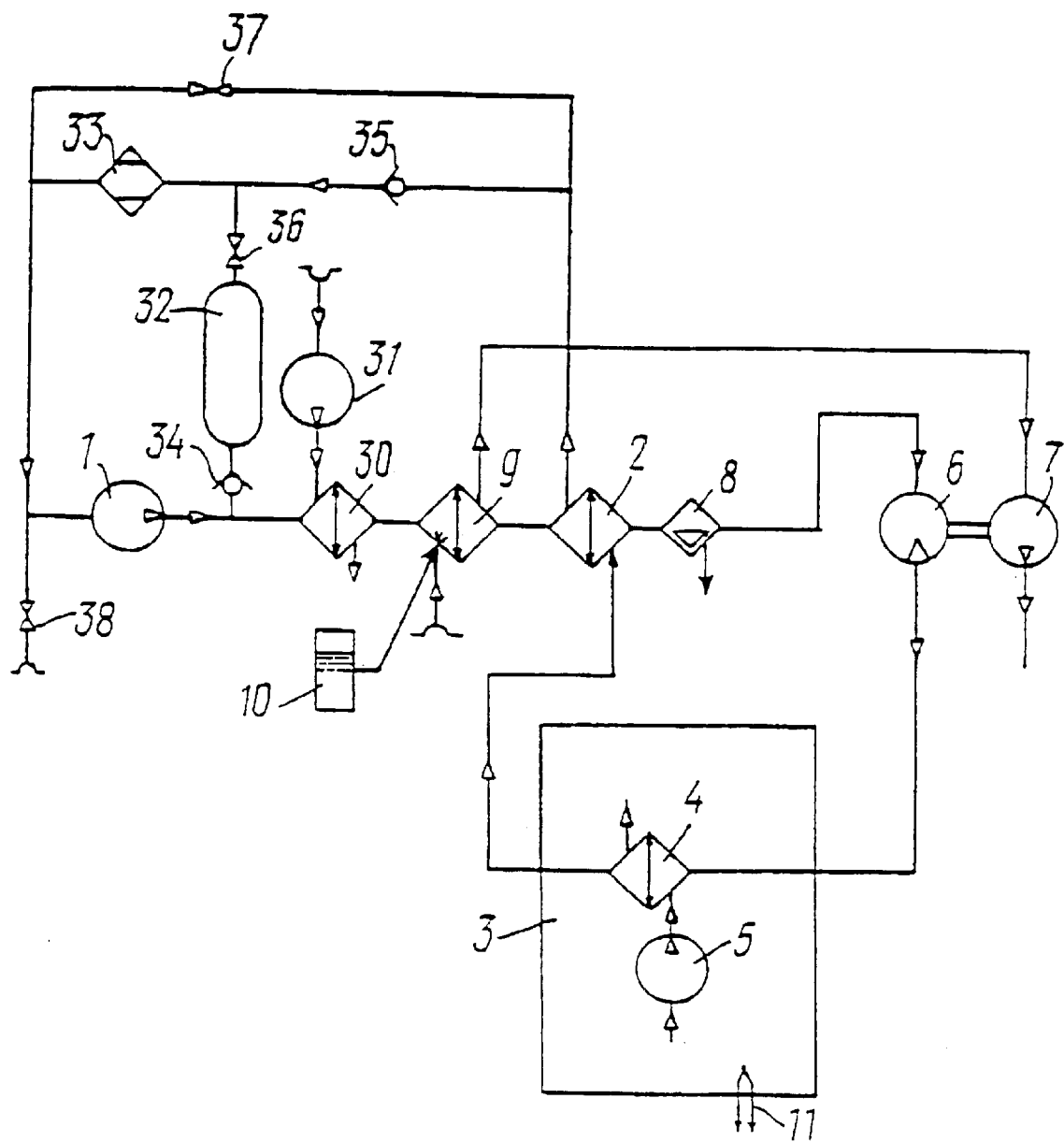
FIG. 6 illustrates the other variant of the cooling device equipped with adsorbing moist separator, receiver and regulated valves.

In the device illustrated by FIG. 6 the compressor 1 output is connected with the first cavity of the vaporization heat exchanger 9. Besides the device comprises double cavity heat exchanger 30 and the fan 31. The first cavity of the heat exchanger 30 is connected with both the compressor 1 output and the first cavity of the vaporization beat exchanger 9. The second heat exchanger 30 cavity is connected with the atmosphere by means of the fan 31.

The device also comprises the receiver 32, adsorbing moist separator 33, reverse valves 34 and 35, regulating valves 36, 37 and 38. The regulating valve 37 is mounted between the second cavity of the heat exchanger 2 and the compressor 1 input. The second cavity of the heat exchanger is additionally connected with the compressor 1 input by means of both the reverse valve 35 and adsorbing moist separator 33, the compressor 1 output is additionally connected between the adsorbing moist separator 33 and the reverse valve 35 by means of the reverse valve 34, receiver 32 and regulating valve 36, the compressor 1 input is additionally connected with the atmosphere by means of the regulating valve 38.

Figure 7:
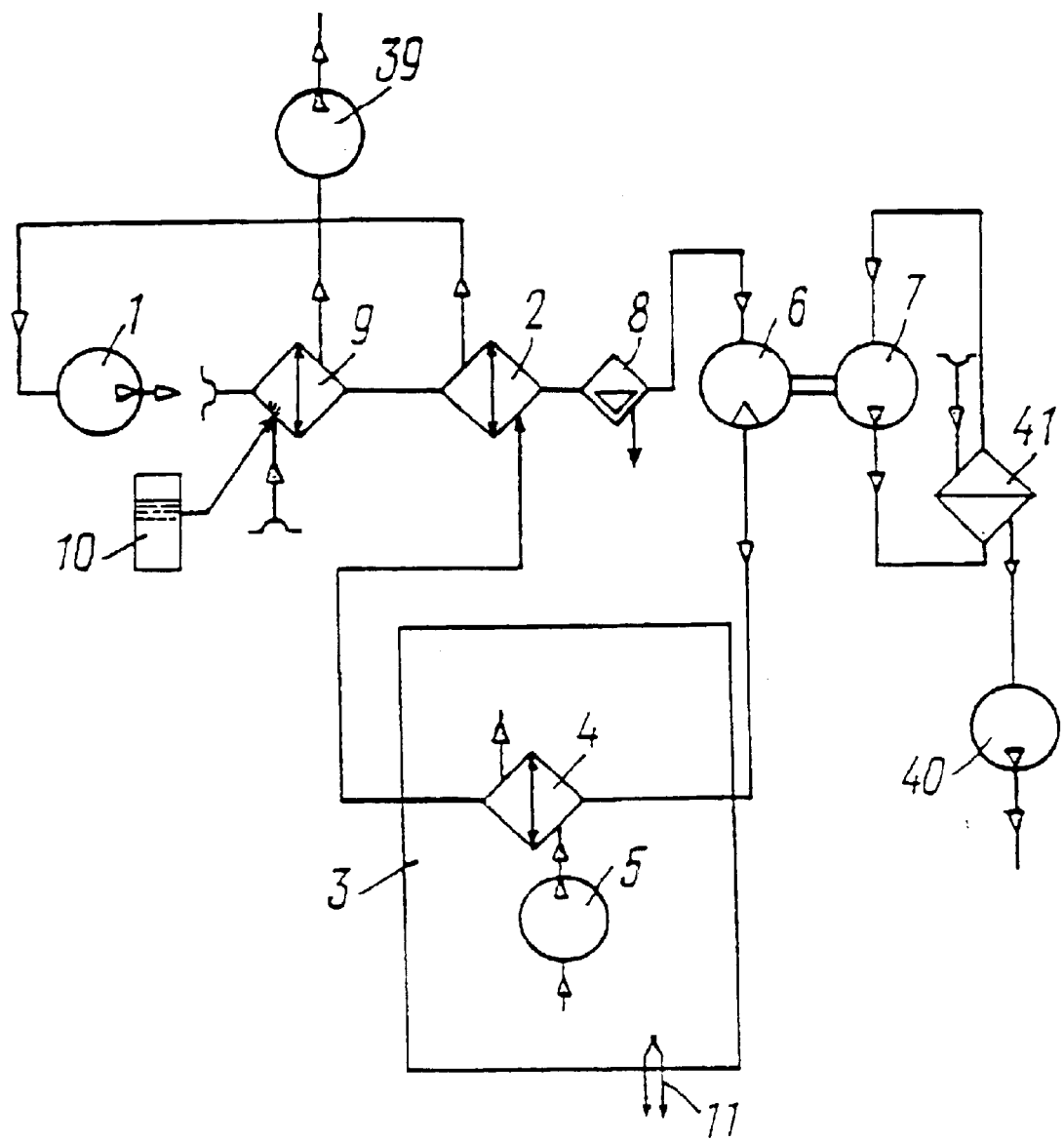
FIG. 7 illustrates cooling device with a closed work circle of the fan connected with turbo expander.

The device illustrated by FIG. 7 comprises fans 39 and 40 and double cavity heat exchanger 41. The second cavity of the vaporization heat exchanger 9 is connected with the atmosphere by means of the fan 39, the first heat exchanger 41 cavity is connected with both the fan 7 input and output. The second cavity of the heat exchanger 41 is connected with the atmosphere by means of the fan 40.

All the above described schemes of the cooling device comprise both moist separator 42 (FIG. 2) and freeze accumulator 43 mounted in sequence between the turbo expander 6 and air cooler 4.

Figure 8:
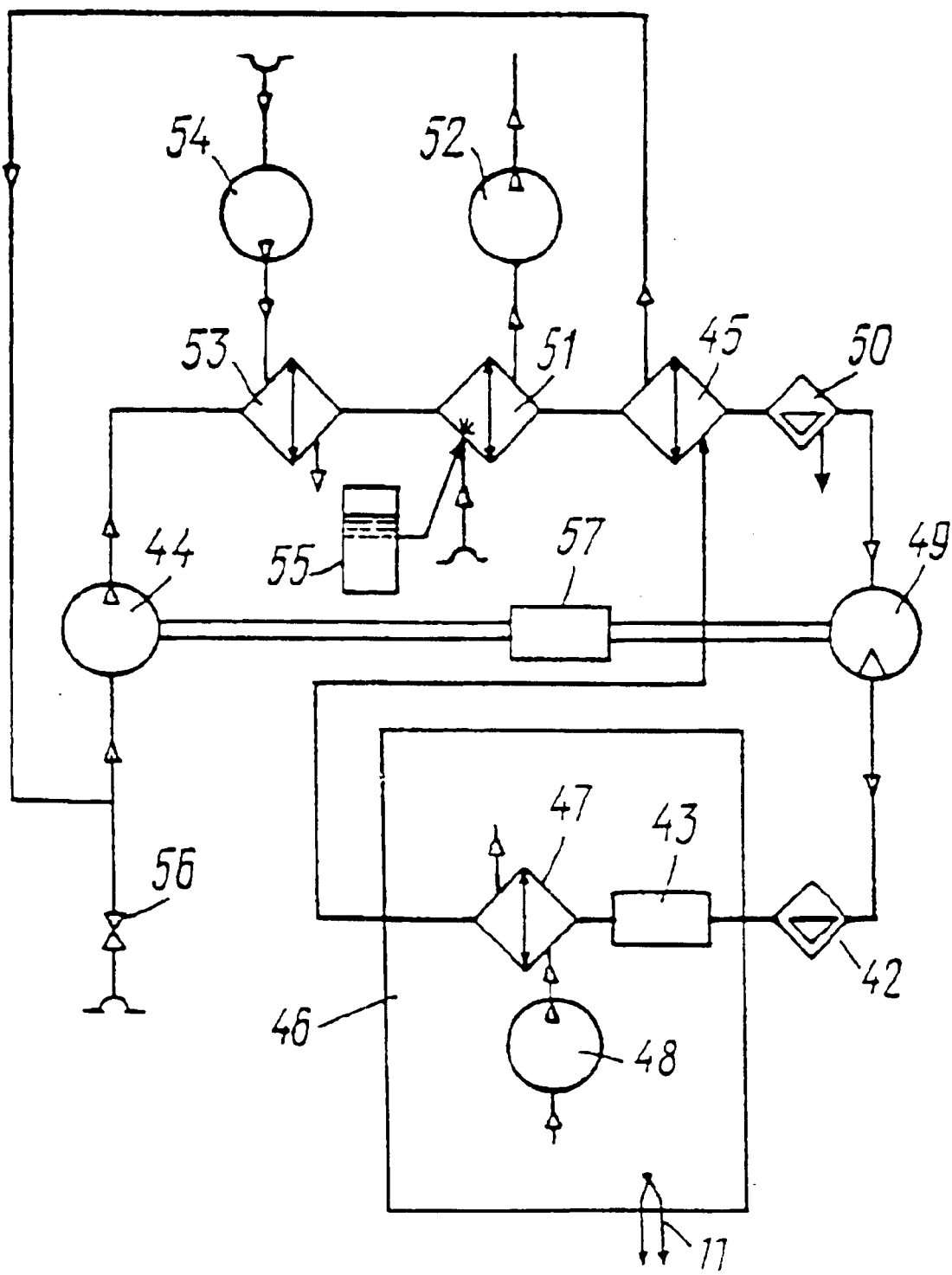
FIG. 8 illustrates air cooling device with the turbo expander and electric compressor.

The air cooling device in its other appearance comprises compressor 44 (FIG. 8), double cavity heat exchanger 45, freezing chamber 46 containing air cooler 47 and fan 48, turbo expander 49, moist separator 50 and double cavity vaporization heat exchanger 51. The compressor 47 is mounted on the same shaft with the turbo expander 49. The first cavity of the vaporization heat exchange 51, the first cavity of the heat exchanger 45, moist separator 50, turbo expander 49, air cooler 47 and the second cavity of the heat exchanger 45 are connected with the compressor 44 input in sequence.

The device comprises fan 52, the second cavity of the vaporization heat exchanger 51 being connected with the atmosphere by means of the fan 52.

The device comprises both double cavity heat exchanger 53 and fan 54. In the heat exchanger 53 its first cavity is connected with the compressor output 44 and the first cavity of the vaporization heat exchanger 51. The second cavity of the heat exchanger 53 is connected with the atmosphere by means of the fan 53.

The device is equipped with the water tank 55 being connected with the first cavity of the vaporization heat exchanger 51.

The device comprises both moist separator 42 and freezes accumulator 43 being mounted in sequence between the turbo expander 49 and air cooler 47 like the scheme in FIG. 2.

The device is equipped with regulating valve 56 by means of which the compressor 44 input is connected with the atmosphere.

The device comprises electric engine 57 mounted on the same shaft with both the turbo expander 49 and compressor 44 that form turbo expander and electric compressor.

The air-cooling devise proposed operates as follows.

According to FIG. 1 the atmosphere air is fed into the vaporization heat exchanger 9, regenerative heat exchanger 2 where the air is cooled and then is fed into the moist separator 8. The air steam condense is caught by the moist separator 8 and the dried air is fed into the turbo expander 6 where it is cooled and fed into the air cooler 4 mounted in the freezing chamber 3 and cooling its inner capacity by means of the fan 5. After that the air of the aircooler 4 is fed into the second cavity of the vaporization heat exchanger 9 and by means of the fan 7 and the simultaneous water feeding into that very cavity of the vaporization heat exchanger 9 out of the tank the process of the vaporization cooling of the atmosphere air is produced, i.e. temperature lowering is achieved. The temperature indicator 11 transfers the impulse to the microprocessor (not shown in the Fig.) which controls the work of the cooling device. The microprocessor switches on the compressor 1 electric engine to cool the freezing chamber 3 up to the temperature required and switches off the engine upon the reach of the temperature.

According to the scheme of the device on FIG. 2, compresses air is fed from the compressor 1 output to the ejector 12 by means of the passive nozzle the atmosphere air is pumped in through the regulating valve 13 and the second cavity of the vaporization heat exchanger 9. The rarefying in this cavity is produced which additionally enforces the process of the vaporization cooling of the atmosphere air thus decreasing its temperature considerably. Out of the ejector diffuser 12 the air is thrown into the atmosphere through the moist separator 14 and the fan 7. The moist separator 14 catches drop moist out of the air and feeds it into the tank 10.

In the device illustrated in FIG. 3 the second cavity of the vaporization heat exchanger has an independent cooling by means of the fan 15 while the connection of the compressor 1 output with the fan 7 input allows increasing of the air pressure fed into the turbo expander 6 thus allowing the increase in cool productivity of the device.

Figure 4:
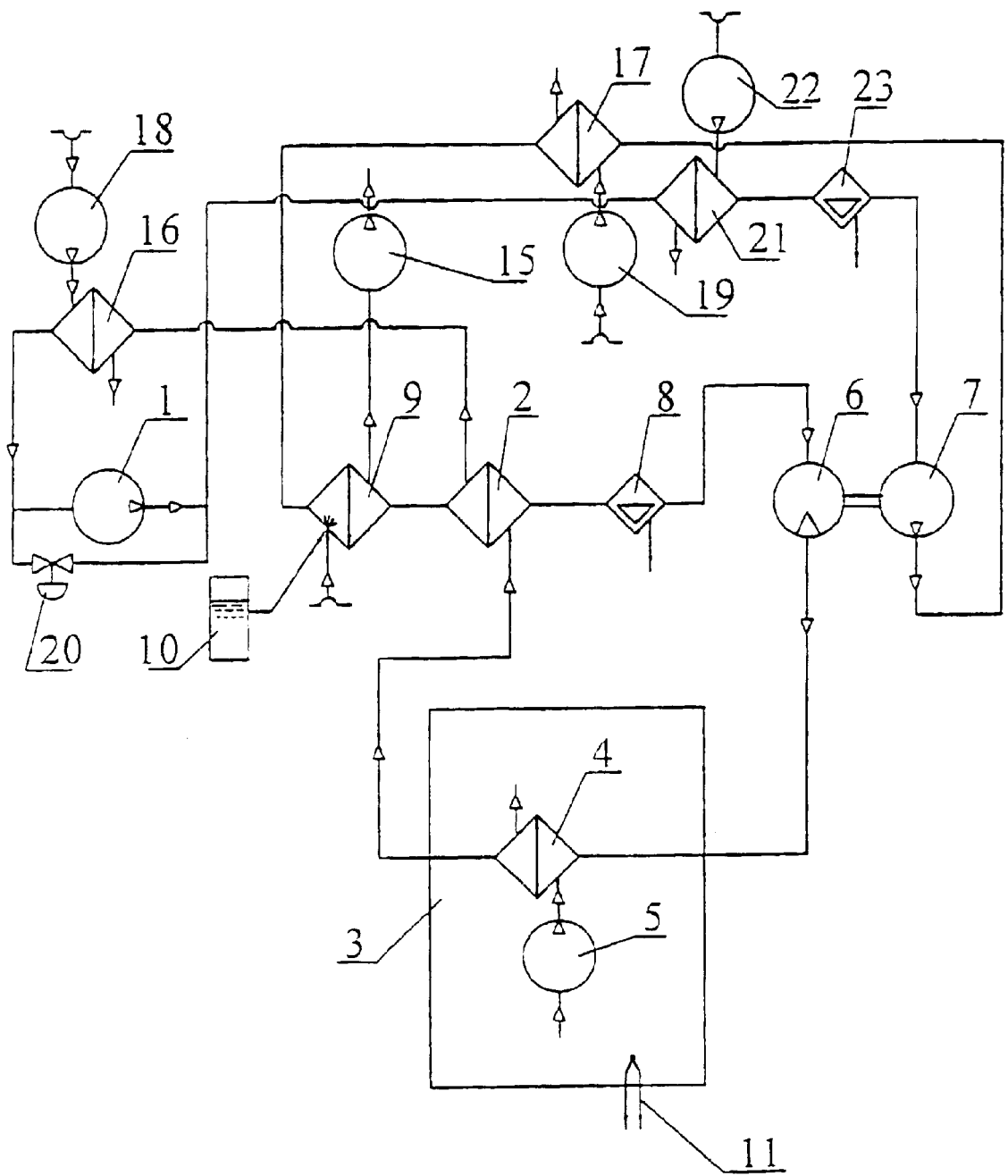
FIG. 4 illustrates the air-cooling device with the group of additional heat exchangers and fans.

In the device illustrated in FIG. 4 the application of the additional heat exchangers along with the fans allow widening the range of the use of the cooling device. The heat exchanger 16 along with the fan 18 can be used as a conditioner. The heat exchangers 17 and 21 together with their fans 19 and 22 and moist separator 23 produce extra air cooling and drying in the system. The regulating valve 20 provides the air transfer from the compressor 1 output to the input under extra nominal working conditions.

During the performance of the cooling device illustrated in FIG. 5 the atmosphere air is totally dried passing through the adsorbing moist separator 24 which provides the ability of the cooling device to work under conditions of negative temperatures without its elements icing. During the operation of the cooling device with the switched off compressor 1, i.e. during "stand by" period, the microprocessor transfers the impulse to open the regulating valves 26 and 27 and the compressed air feeds into adsorbing moist separator 24 out of the receiver 25 thus renewing its adsorbing abilities for the following working cycle of the cooling device and is mounted on to the atmosphere by means of the regulating valve 26.

The cooling device illustrated in the FIG. 6 has a closed working cycle with air feeding out of the atmosphere by means of the regulating valve 38. The adsorbing moist separator 33 in conditions of the closed valve 37 provides full air drying inside the system. The strengthening of the working ability of the adsorbing moist separator 33 is effected during the "stand by" of the cooling device by means of the valve 36 opening snf dry compressed air feeding out of the receiver 32 to adsorbing moist separator and setting it on to the atmosphere by means of the valve 38.

The closed working cycle of the cooling device in conditions of dry air is effected by means of the open valve 37 without the use of the adsorbing moist separator 33. Depended on the operating conditions of the cooling device the microprocessor transfers an impulse either to open or to close the valves 36, 37 and 38 thus providing its optimal operation.

According to the scheme illustrated in FIG. 7 in conditions of the connection between the fan 7 and the heat exchanger 41 the closed circuit work along with the considerate noise level lowering operation of the fan 7 is provided. The heat drawning aside from the heat exchanger 41 is effected by means of the fan 40. In this case the fan 39 provides the vaporization heat exchanger 9 blowing off.

Figure 9:
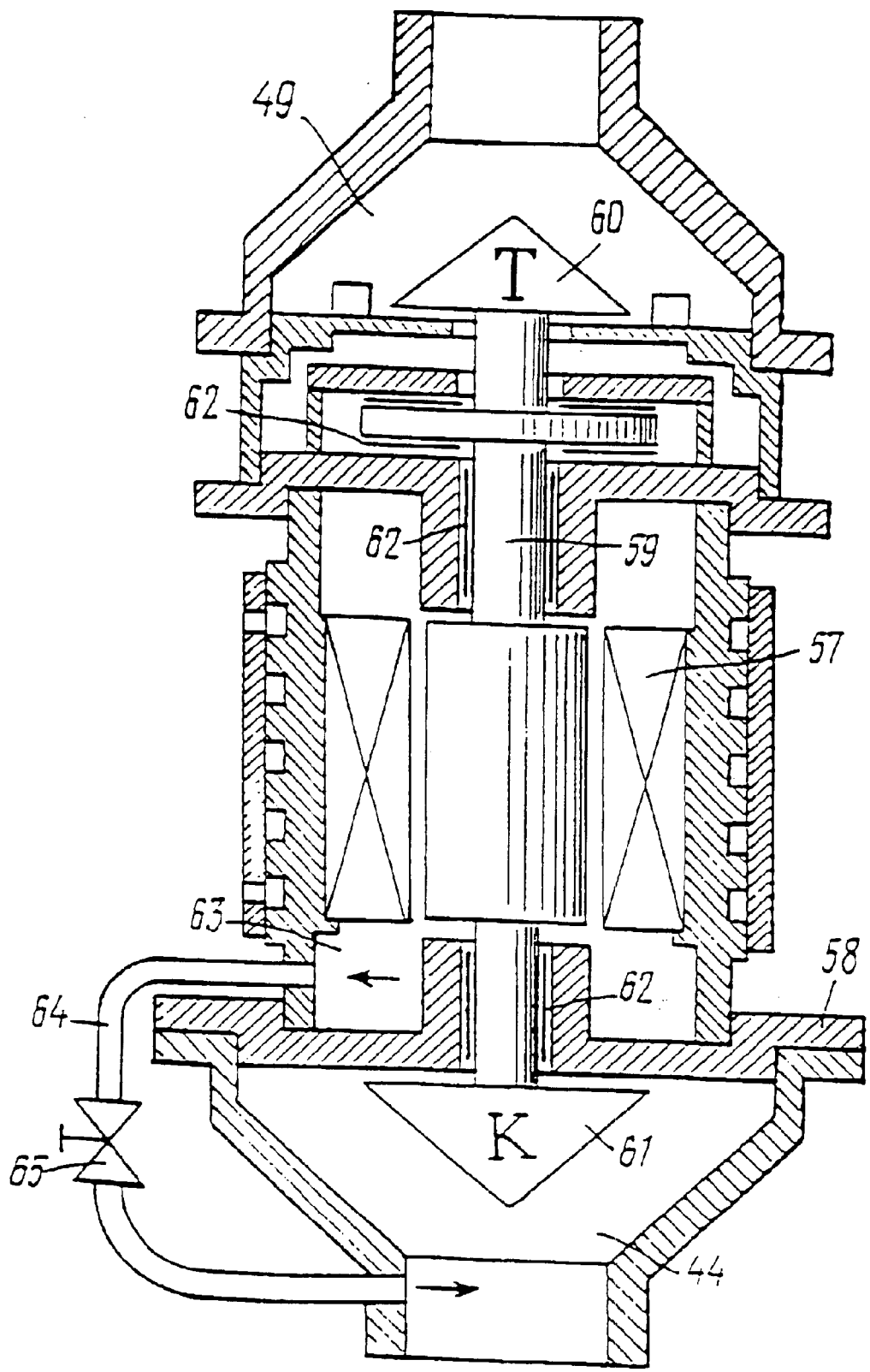
FIG. 9 illustrates longitudinal cut of the turbo expander and electric compressor.
Figure 10:
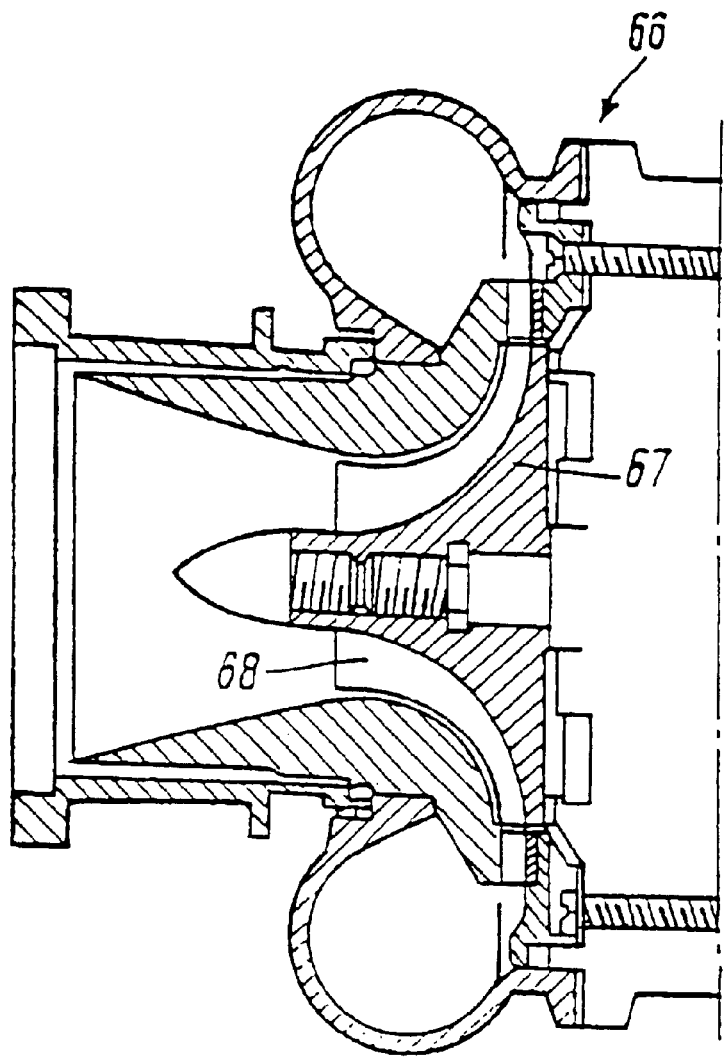
FIG. 10 illustrates the longitudinal cut of the turbo wheel.
Figure 11:
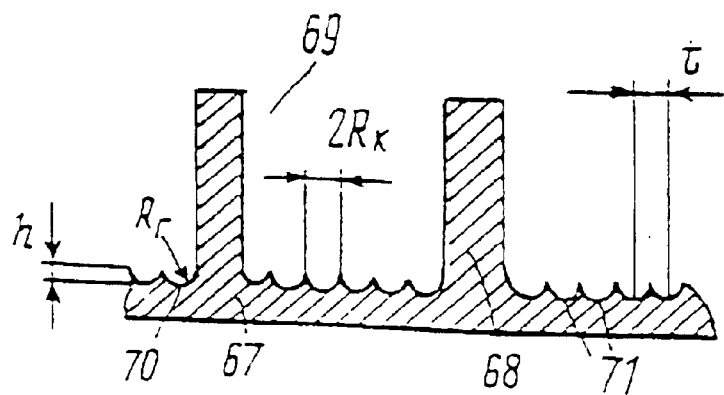
FIG. 11 illustrates the reamer of the turbine wheel inter blade canals input

Under the operating conditions of the device illustrated in FIG. 9 a considerable economy of the electricity when feeding from, for example, electric engine is effected. As the breaks of the turbine expander 49 turbine are effected as the compressor 44 and the electric engine compensates only a part of the power necessary for compressor 44 drive the rest of the power is produced by the turbo expander turbine 49.

All the above mentioned schemes are equipped with the moist separator 42 (FIG. 2) and freeze accumulator (43) the moist separator 42 provides air drying in the system while the freeze accumulator 43 aims at cold accumulating inside the freezing chamber 3 thus providing maintenance of the low temperatures in conditions of, for example, "stand by" or under long time open chamber 3 door.

Turbo expander and electric compressor shown in FIG. 9 comprise the body 58 containing the built-in highly revolving electric engine 57 the turbine and compressor wheels 60 and 61 are mounted cantilever on the shaft 59.

The shaft 59 is mounted in the radial and double axial gas- and dynamic bearing 62, for example, of petal type. The cavity 63 between both the bearing 62 of the compressor wheel 61 and electric engine 57 is connected by means of the canal 64 of the remounted with the input into compressor 44. In the remounted canal 64 the regulating throttle 65 is mounted.

The turbo expander and electric compressor operate as follows.

Upon the electricity feeding the electric engine 57 rotates the shaft 59 which is at the same time an electric engine rotor 57 up to the operating frequency of rotation (in a model sample up to 96000 rotations per minute). The mechanic energy is transferred to the compressor wheel 61 that compresses the air (gas). Then the compressed gas being cooled by means of the heat exchangers system of the air cooling device is fed into turbo expander 49 and is expanded both inside the nozzle apparatus and turbine wheel blades 60. This process is followed by the operation gas temperature lowering, i.e. the turbine period if the main one in cold generating of the cooling device. The power of the compressed gas being transformed into the mechanic power of the turbine wheel 60 and upon passing the system of heat exchangers of the cooling device again is fed to the compressor wheel 61.

The gas pressure at the output of the compressor wheel 61 is always higher than that at the input of the turbine wheel 60. To avoid the penetration of the hot gas (being compressed in the compressor) to the turbine input reducing the temperature difference in it the gas (air) restart canal 64 between the cavity 63 to the compressor input 44 is created. (The hot gas can penetrate to the turbine input by means of inside cavities, bearings 62, the cavity between the stator and rotor of the electric engine 57). Such construction allows avoiding of the gas penetration from the compressor to the turbine. The problem of gas and dynamic bearings 62 cavity and electric engine rotor 57 cooling is solved simultaneously.

The regulated throttle 65 mounted in the restart canal 64 allows the turbo expander and electric compressor to be tuned for the maximum possible pressure difference in its turbine.

The turbo wheel 66 of the turbo expander comprises bearing disk 67 (Gig 10–11) with blades 68 and inter blade canals 69 formed by the side surfaces of the nearest blades 68 conjugated with meridional disk 67 surface by means of the flutes 70. Longitudinal canals 71 are effected on the said disk with cross cut effected as a part of the circle. Radius R1 of the flute 70 is calculated upon the strength conditions.

Radius Rk of the micro canal 71 cross cut is about 0.1–1.0 of the radius Ri

The flute 70 can be effected along the whole blade length 68 from both sides and micro canals 71 by means of mill, the cut having on its edge a round off with a radius equal to the cut half diameter d.

The micro canals 71 parameters Rk, R1, t, h as well as R correlation is necessary for providing the configuration of the micro canal bottom required in case of the icing.

Turbine operating under cycle conditions (operate—stand by) the icing of the inter blade canals and its melting is effected/it's important that the melted ice should leave the surface of the wheel and be blown off by the air steam/ For this very purpose micro canals 71 with the cross cut made as a part of a circle are created. In the very narrow cut they form a smooth canal of the same radius thus redusing the level of hydro losses without preventing the air and ice particles moving thus increasing the turbo wheel work efficiency.

INDUSTRIAL APPLICABILITY

The invention can find most utility when applied for making cooling appliances, and especially in the coolers and air conditioning systems as well as in the permanent complexes and on different means of transport.

What is claimed is:

1. A cold air refrigeration system comprising a compressor (1, 44) having an inlet and an outlet, a turbo expander (6, 49), having a turbine wheel, a double cavity heat exchanger (2, 45), said compressor being connected to said turbo expander, a fan (7, 52) connected to said turbo expander, a vaporization heat exchanger (9, 51) having a first cavity and a second cavity, a moisture separator (8, 50) and a freezing chamber (3, 46), the freezing chamber including a fan (5, 48) and an air cooler (4, 47), a first cavity of said heat exchanger (2, 45), the first cavity of said vaporization heat exchanger (9, 51), said moisture separator (8, 50), said turbo expander (6, 49), said air cooler (4, 47) and a second cavity of said heat exchanger (2, 45) being connected in series to the inlet of the compressor (1, 44), the system further including and a water tank (10, 55), the water tank being connected to the second cavity of the vaporization heat exchanger (9, 51).

2. A cold air refrigeration system as constructed in accordance with claim 1 further including a shaft interconnecting the fan (7) and the turbo expander (6).

3. A cold air refrigeration system as constructed in accordance with claim 2 wherein the second cavity of the vaporization heat exchanger (9) is in communication with the atmosphere through the fan (7).

4. A cold air refrigeration system as constructed in accordance with claim 2 further including an ejector (12) having a passive nozzle, an active nozzle, and a diffuser, the system further including an adjustable valve (13) and a second moisture separator (14), the passive nozzle of the ejector being in communication with the atmosphere through the second cavity of the vaporization heat exchanger (9) and the adjustable valve (13), the active nozzle of the ejector being connected to the outlet of the compressor (1) and the diffuser of the ejector (12) being connected to the inlet of the fan (7) through the second moisture separator (14).

5. A cold air refrigeration system as constructed in accordance with claim 2 further including a second fan (15), the second fan (15) interconnecting the inlet and the outlet of the second cavity of the vaporization heat exchanger (9) to the atmosphere, the outlet of the first fan (7) being connected to the inlet of the first cavity of the vaporization heat exchanger (9).

6. A cold air refrigeration system as constructed in accordance with claim 5 further comprising two double-cavity heat exchangers (16, 17), a third fan (18), and a fourth fan (19), and an adjustable valve (20), a first cavity of the first additional heat exchanger (16) being connected to the second cavity of the heat exchanger (2) and to the inlet of said compressor (1), a second cavity of said first additional heat exchanger (16) being in communication, through said third fan (18), with the atmosphere, a first cavity of said second additional heat exchanger (17) being connected to the first cavity of said vaporization heat exchanger (9) and to the outlet of said first fan (7), a second cavity of said second additional heat exchanger (17) being in communication, through said fourth fan (19), with the atmosphere, said adjustable valve (20) being interposed between the inlet and outlet of said compressor (1).

7. A cold air refrigeration system as constructed in accordance with claim 6 further comprising a fifth double-cavity heat exchanger (21) having a first cavity and second cavity, a fifth fan (22), a second moisture separator (23), the first cavity of said fifth heat exchanger (21) being connected to the outlet of said compressor (1) and, via said second moisture separator (23), to the inlet of said fan (7), a second cavity of said fifth heat exchanger (21) being in communication with the atmosphere via said fifth fan (22).

8. A cold air refrigeration system as constructed in accordance with claim 2 further comprising a sixth fan (39), a seventh fan (40) and a double-cavity heat exchanger (41), a second cavity of said adsorption moisture separator (9) being in communication with the atmosphere via said sixth fan (39), a first cavity of said heat exchanger (41) being connected to the inlet and outlet of said fan (7), a second cavity of said heat exchanger (41) being in communication with the atmosphere via said seventh fan (40).

9. A cold air refrigeration system as constructed in accordance with claim 2, further comprising a moisture separator (42) and a cold accumulator (43), both being positioned in series between said turbo expander (49) and said air cooler (47).

10. A cold air refrigeration system as constructed in accordance with claim 1 further including a shaft, the shaft interconnecting the compressor (44) and the turbo expander (49), the second cavity of the vaporization heat exchanger (51) being in communication with the atmosphere through the fan (52), the second cavity of the vaporization heat exchanger (51) including an outlet which is connected, through the heat exchanger (45) and the moisture separator (50) to the inlet of the turbo expander (49).

11. A cold air refrigeration system as constructed in accordance with claim 10, wherein said turbine wheel (66) comprises a bearing disk (67) provided with blades (68) and blade passages (69) defined by side surfaces of adjacent blades (68), hollow flutes (70) through which said side surfaces of said adjacent blades (68) are mated with a meridional surface of said disk (67), said meridional surface of said disk having longitudinal canals (71), the canals (71)

having a cross-sectional area shaped as part of a circumference, the radius (Ru) of said part of a circumference being from 0.1 to 1.0 the radius ($R_r$) of said hollow flute (70), the pitch (t) of said canals (71) being not in excess of two said radii ($R_k$) and the height (h) of said canals (71) being from 0.2 to 1.0 times said radius ($R_k$).

12. A cold air refrigeration system as constructed in accordance with claim 1 further including a shaft, the shaft interconnecting the compressor (44) and the turbo expander (49), an electric motor (57) coupled to the shaft, whereby a common turbo expander and motor driven compressor system is provided.

13. A cold air refrigeration system as constructed in accordance with claim 12, wherein the turbo expander and motor driven compressor system comprises a body (58) accommodating said turbo expander (49), said electric motor (57)) and said compressor (44), the electric motor (57) including an output shaft (59), the shaft (59) being journalled in a plurality of bearings (62), the turbine wheel (60) being mounted to the shaft (59) and a compressor impeller (61) mounted to the shaft (59), the body (58) including a space (63) defined between one of said bearing (62) and said electric motor (57), said space (63) being connected to the inlet of said compressor (44) through a bypass channel (64).

14. A cold air refrigeration system as constructed in accordance with claim 13, further comprising a variable throttle (65) disposed in said bypass channel (64).

15. A cold air refrigeration system as constructed in accordance with claim 1 further comprising an adsorption moisture separator (24) interposed between the first cavity of said vaporization heat exchanger (9) and the first cavity of said heat exchanger (2), a receiver (25) having an inlet and an outlet, a pair of adjustable valves (26, 27), the inlet of said compressor (1) being connected to the first cavity of said heat exchanger (2) and being in communication with the atmosphere via said adjustable valve (26), a pair of check valves (28, 29), a first of said check valves (28) and said adsorption moisture separator (24) being interconnected in series between the first cavity of said vaporization heat exchanger (9) and the first cavity of said heat exchanger (2), the outlet of said compressor (1) being connected to the inlet of the receiver (25), an outlet of the receiver (25) being connected, through said adjustable valve (27), between said check valve (28) and said adsorption moisture separator (24), said receiver (25) being in communication with the atmosphere via said check valve (29).

16. A cold air refrigeration system as constructed in accordance with claim 1 further comprising a double-cavity heat exchanger (30, 53) and a further fan (31, 54), a first cavity of said double cavity heat exchanger (30, 53) being connected to the outlet of the compressor (1, 44) and to the first cavity of said vaporization heat exchanger (9, 51), a second cavity of said heat exchanger (30, 53) communicating, via said fan (31, 54) with the atmosphere.

17. A cold air refrigeration system as constructed in accordance with claim 16 further comprising a receiver (32), an adsorption moisture separator (33), a pair of check valves (34, 35), a plurality of adjustable valves (36, 37, and 38), one adjustable valve (37) being interposed between the first cavity of said heat exchanger (2) and the inlet of said compressor (1), the outlet of the compressor (1) being connected, through said check valve (34), said receiver (32) and said adjustable valve (36), between said adsorption moisture separator (33) and said check valve (35), the inlet of said compressor (1) additionally being in communication with the atmosphere via said adjustable valve (38).

18. A cold air refrigeration system as constructed in accordance with claim 1, further comprising a moisture separator (42) and a cold accumulator (43), both being positioned in series between said turbo expander (6) and said air cooler (4).

* * * * *